Patented Dec. 16, 1941

2,266,637

UNITED STATES PATENT OFFICE 2,266,637

WATERPROOFING AND FLEXIBILIZING CLAY FILMS

Ernst A. Hauser, Cambridge, Mass., assignor to Research Corporation, New York, N. Y., a corporation of New York No Drawing. Application February 18, 1939, Serial No. 257,247

23 Claims. (Cl. 25—156)

In my application Serial No. 212,398, filed June 7, 1938, I have described the production of flexible, coherent, self-supporting solid bodies such as films, filaments and the like from natural crystalline inorganic hydrous oxides containing structural water and capable of swelling when brought in contact with water to form plastic hydro-gels and exhibiting base exchange properties such as hydrous aluminum and magnesium silicates, e. g., bentonite. According to said application the material is refined by suspending it in water and centrifuging or settling to separate gritty material, probably consisting principally of quartz, and coarse particles substantially exceeding colloidal size so as to produce a product consisting principally of particles of the substantially pure material of colloidal dimensions. It is further indicated in said application to be desirable to produce a suspension of the smaller particle sizes such as 0.01 to 0.5 micron in which the particles are nearly of the same size, i. e., substantially monodisperse.

I have now found that it is possible to produce self-supporting films, filaments and the like from sols and gels which although of colloidal dimensions are not substantially monodisperse. According to my present experience self-supporting films, filaments, etc., can be made from any sol or gel of the specified materials of any polydisperse or monodisperse character so long as the particles are of colloidal dimensions. By the term "self-supporting" in the description of the coherent, self-supporting, flexible, solid bodies, I mean bodies which in the absence of any physical support and in sizes of say up to 1 foot maximum dimension, are capable of being handled, e. g. picked up between thumb and finger, without tearing or breaking.

The hydrous oxide may be found in the natural state in sufficient purity that no refining is necessary. Such material may be simply suspended in water and used directly. In the case of a magnesium silicate bentonite which is commercially available and contains practically no particles over 1 micron in diameter, it may be suspended in water, allowed to settle for a short time to remove any coarse particles, concentrated to a gel and used. The refining of the hydrous oxide may of course be carried out in any suitable way such as by the use of any suitable suspending liquid other than water or by wind sifting and the refined material then suspended in water to swell the particles and form the gel.

It will be further understood that whether the sol or the gel is used as the film forming material, the gel stage immediately precedes the solid state. If the sol is applied to a surface as a coating, it passes through the gel state to the solid state by drying. The sol is quite dilute and highly fluid and will produce only a relatively thin deposit of solid material. If a small amount of electrolyte is added to a sol, it will form a gel which may be used for the production of films but here again the high dilution of the gel or the low concentration of solids must be considered. If the addition of electrolyte to the sol is carried so far as to cause precipitation the resulting suspension is practically useless for the production of films. But a gel produced by concentration and containing a sufficiently high concentration of solids, e. g., 3% or higher or such a gel after slight or incipient flocculation without precipitation by the addition of electrolyte may be used directly for the production of films, filaments and the like. The air dried film, filament or the like, however, prepared, generally contains 6–10% of water.

In bentonite, the essential ingredient appears to be the mineral montmorillonite which generally constitutes 75% or more of bentonites which are found to be suitable for the production of films, filaments and the like.

Films, filaments, coatings, etc., may be made by customary methods, e. g., by extrusion, spraying, electro-deposition or spreading. The films, etc., may be formed on a suitable surface and removed therefrom and may be dried and baked and heated to high temperatures and/or subjected to pressure to produce certain effects. The films, filaments, etc., produced as described in said application are, as stated therein, self-supporting and capable of being handled and used for many purposes but they are relatively fragile and moreover unless they have been heated to about 600° C. or higher are not entirely water resistant and such heating tends to render them quite brittle.

In a companion application Serial No. 257,248, filed February 18, 1939, I have described and claimed the production of various articles such as films, coatings, filaments, etc., of the type generally regarded as being obtainable by suitable manipulation of liquid or plastic, i. e., flowable or moldable, compositions consisting of or comprising an ingredient capable of solidifying and acting as a binder, from mixtures of the natural crystalline inorganic hydrous oxide capable of forming plastic hydro-gels with other materials such as finely divided organic fibrous materials, e. g., paper pulp, jute, silk, cotton, synthetic fibers and the like, inorganic fibrous materials, e. g., asbestos, rock wool, glass wool and the like, powdered and flake materials, e. g., ground mica and metal flakes or powders, e. g., aluminum and copper powders, also dyes and pigments such as titanium dioxide, lithopone, carbon black, etc., and water emulsions of materials such as asphaltum, nitrocellulose and waxes.

An object of the present invention is to render all such films, filaments, etc., whether formed of the substantially pure hydrous oxide or of mixtures thereof with other finely divided materials, more water resistant and to improve their softness, flexibility and crease resistance.

For the purpose of illustration bentonite will be referred to hereinafter as an example of a suitable hydrous oxide and the invention will be described more particularly with reference to the production of films.

For rendering the films water resistant either the formed film after air drying or drying up to a temperature of about 120° C. may be treated with suitable agents to be described below or said agents may be added to and mixed with the sol or gel prior to the formation of the film. At 432° C. the film is dehydrated but is still capable of regaining water very slowly and theoretically at least is still capable of responding to the action of the treating agents. By water resistant I mean that the film is rendered capable of being soaked or even boiled in water for a long period of time, say one hour or more, without any apparent change in the physical character of the film such as swelling or disintegration.

The amount of treating agent required is small. When applying the treating agent to the formed (air dried) film the optimum conditions for treatment must be determined in each instance depending on the thickness and other physical characteristics of the film, the concentration and temperature of the treating agent and the effect desired. For example in treating air dried bentonite films 2-3 mils in thickness with a saturated solution of lead acetate, a plurality of films were immersed in the solution at room temperature and samples were withdrawn every 2 or 3 minutes, dried at room conditions for several hours and then placed in boiling water to test the effect of the treatment. By this procedure it was found that 30-45 minutes was required to produce the maximum effect. Samples treated for a somewhat shorter time were water resistant, in that they did not swell when boiled in water but they were quite fragile and some of them disintegrated in the boiling water. This test indicates that the lead acetate treatment produces the double effect of rendering the films water resistant and stronger.

A similar test made with saturated lead acetate solution at 55° C. showing that 20-25 minutes treatment was sufficient. In general the treating time varies inversely with the temperature of the treating agent. Also in general the more concentrated the treating agent the shorter is the treating time and of course the thinner is the film the shorter is the treating time. Only a very small quantity of the treating agent is consumed in the treatment.

When the treating agent is added to the gel before the film is formed, tests with lead acetate have shown that quantities of the order of ten per cent are sufficient to give satisfactory results.

The electrical properties of the films, which are an important consideration, since the electrical properties of the films indicate a valuable use of them, are greatly improved by the treatment. As has been indicated above the treatment which renders the films waterproof, when properly applied, also serves to improve their tensile strength.

In addition to rendering the films water resistant it is desirable for certain purposes also to improve their flexibility or crease resistance. A film is considered to be sufficiently crease resistant for many practical purposes when it can be creased once without breaking. Even a less crease resistance or flexibility is sufficient for many purposes. The above described treatment for rendering the films water resistant generally also renders the films somewhat more brittle and the treatment to be described hereinafter is particularly important for certain purposes.

I have found that while certain chemical treating agents serve to improve the water resistance of the films, others serve to improve the flexibility of the films. The agents for flexibilizing the films may be applied before or after the treatment for rendering the films water resistant and in some instances, when the two treating agents are compatible, the film, after it is formed, may be treated with the two agents simultaneously.

Heating the films before the chemical treatment for rendering them water resistant, provided the heating is not so high as to render the treatment ineffective, appears to be without effect but heating the films after the treatment greatly improves the electrical properties of the films. Heating the so treated films to only a little above 100° C. say 105° C. serves to expel adsorbed water from the film which once removed does not return upon exposure of the films to the atmosphere. The same effect is obtained more slowly by extended exposure to normal room temperatures. The air dried films before any treatment contain 6-10% moisture depending on the conditions under which they are dried. After treatment with lead acetate and air drying they contain about 2.6% moisture and after heating at 105° C. about 0.3% moisture. Boiling the films in water after the chemical treatment to render them water resistant generally renders them tougher and stronger.

As has been indicated both the agents for improving water resistance and the agent for flexibilizing the films may be applied separately and when compatible may be applied together to the film and if done carefully some of the agents for improving water resistance may be added to the gel before the film is formed.

A variety of treating agents have been tested and found to be suitable.

Consideration of the character and effects of the treating agents which are operable compared to other chemicals which are not operable indicates that the molecules or the active ions of the treating agents must, in both cases, be of such a character as to be able to enter the lattice structure of the material or to neutralize the electric surface charge of the clay particles. In the case of the agents serving to render the films water resistant the action of the agent if it is present in the form of a true solution appears to consist of a base exchange reaction between the exchangeable cation of the silicate and the cation of the treating agent. If it is a colloidal dispersion the action appears to be caused by electric neutralization of surface charges. In the case of the agents which serve to render the films more flexible the theory may be advanced that the molecules of the treating agent enter the lattice structure of the silicate and serve to lubricate it. It appears that the operability of the agents for rendering the films water resistant depends upon their ability to change the electrokinetic characteristics of the silicate.

The action of the agents which render the films of base exchangeable hydrous oxides resistant to water may be further explained and the agents further characterized as follows. It appears from a comparison of the diameters of the cations of effective agents with the cations of agents which are capable of base exchange with the exchangeable base of the hydrous oxide but are not effective that the cations which are effective have a fairly definite minimum diameter whereas the non-effective cations have a substantially smaller diameter. The minimum effective diameter depends upon the structure of the hydrous oxide. In the case of montmorillonite, the principal constituent of bentonite, the minimum diameter of the cations of effective agents appears to be about 2.6 Angstrom units or at least about as large as the spacing between the opposite oxygen atoms in the hexagonal silicon-oxygen sheet of the unit crystal of montmorillonite. Such cations apparently enter the films by base exchange and are bound by residual valencies and serve to bind adjacent unit sheet-parcels together whereas smaller cations, even though they may enter the film by base exchange and become fixed in the lattice structure by residual valencies fall into the internal structure of the lattice and remain free moving in the space available and do not bind the adjacent unit sheet-parcels together.

I have found both inorganic and organic agents to be effective in rendering the films water resistant. Examples of operable agents are concentrated solutions of potassium hydroxide, mercurous nitrate, calcium, barium, strontium, magnesium, manganese, cobalt and lead chlorides (lead chloride is effective only in hot solution), magnesium, cobalt and copper nitrates, zinc, manganese, nickel and copper sulfates, calcium, barium, magnesium, zinc, uranium, copper and lead acetates, iron chlorides and thorium nitrates, chromium and aluminum sulfates, chromium and iron acetates and colloidal iron oxide and aluminum oxide dispersions. Various acids were tried and found to be less effective. The results of extensive testing of compounds indicates that the anions of the compounds used are of secondary importance only and that the prime requisites of the operable compounds are that their cations shall be capable of base exchange with the exchangeable base of the silicate and that the compound shall be sufficiently soluble in water. Among salts of monovalent cations those which exert a base exchange action are effective. All of the compounds of multivalent cations which are sufficiently soluble in water, which solubility may be increased by heating, are effective. The organic compound trimethylbenzyl ammonium hydroxide also was found to be effective. Most of these treating agents for rendering the films water resistant also tend to render the film more brittle which brittleness, however, may be removed by the action of the agents to be disclosed hereinafter for increasing flexibility. Films treated with colloidal ferric oxide or colloidal alumina are rendered water resistant. Colloidal ferric oxide or colloidal alumina when added to a sol or gel of bentonite in sufficient amounts cause incipient flocculation and the film produced from the resulting mixture is water resistant. This fact supports my theory that the anion of the added agent is of secondary importance so far as rendering the films water insoluble is concerned. It indicates that rendering the films insoluble is essentially an electrokinetic phenomenon and that colloids of opposite charge to those of the film forming material generally may serve to render the films insoluble in water. In the case of iron oxide and alumina it appears that their positively charged colloidal nuclei have replaced the adsorbed cation of the bentonite.

Examples of agents capable of improving the flexibility of the films are ethylene glycol monoethyl ether, ethylene glycol mono-methyl ether, ethylene glycol mono-butyl ether, methyl acetate, ethyl acetate, isopropyl acetate, butyl acetate, cellosolve acetate, methyl cellosolve acetate, ethylene glycol, propylene glycol, methylisobutylketone, diisobutylketone and butyl carbitol. A consideration of these compounds and a comparison thereof with other compounds which are not effective leads to the generalization that those organic compounds which are at least partially soluble in water and do not contain an aromatic ring or a side chain in the middle of molecule are effective. In other words the solubility and the configuration of the molecule of the treating agent appear to determine its ability to soften the film. The molecule of the treating agent apparently must be free of any group which results in steric hindrance and prevents the molecule from entering the aluminum silicate lattice.

A film treated with lead acetate to produce water resistance after drying for several days at 105° C. was found to have an electrical resistance of the order $10^{13}$ ohms per cm.$^3$ and a break down resistance of 2000–3000 volts per mil. On exposure to the atmosphere after the heating to 105° C. the electrical properties of the film remained unchanged.

Films may be softened without being rendered water resistant by applying only the above described treatment for the latter purpose but the resulting films are water soluble or swellable if immersed in pure water.

Various combinations of the two treatments may be applied. The preferred treatment is to first waterproof the film and then improve its flexibility but it is possible to reverse the order of these steps.

I claim:

1. Process which comprises forming a coherent self-supporting flexible solid body consisting essentially of a crystalline inorganic hydrous oxide containing structural water and capable of swelling when brought in contact with water to form a plastic hydro-gel and exhibiting base exchange properties and rendering said solid body insoluble in water by the action of a soluble electrolyte salt containing a cation capable of base exchange with said hydrous oxide, the exchanging cation being less hydrated than the exchanged cation.

2. Process as defined in claim 1 in which the electrolyte salt is added to the hydrous oxide prior to formation of the solid body.

3. Process as defined in claim 1 in which the solid body is contacted with a solution of the electrolyte salt.

4. Process as defined in claim 1 in which the solid body is contacted with a solution of a water soluble salt of a metal capable of base exchange with said hydrous oxide.

5. Process which comprises forming a coherent self-supporting flexible solid body consisting essentially of a crystalline inorganic hydrous oxide containing structural water and capable of swelling when brought in contact with water to form a plastic hydro-gel and exhibiting base exchange properties and rendering said solid body insoluble in water by the action of a colloidal dispersion, the disperse phase of which carries a charge opposite to the surface charge of said hydrous oxide.

6. Process as defined in claim 5 in which the colloidal dispersion is added to the hydrous oxide prior to formation of the solid body.

7. Process as defined in claim 5 in which the solid body is contacted with the colloidal dispersion.

8. Process as defined in claim 5 in which the solid body is contacted with a colloidal dispersion of alumina.

9. Method of improving the flexibility of a coherent, self-supporting, flexible solid body consisting essentially of a crystalline inorganic hydrous oxide having a lattice structure and containing structural water and capable of swelling when brought in contact with water to form a plastic hydro-gel and exhibiting base exchange properties which comprises treating said solid body with an organic compound which is soluble in water and capable of entering the lattice structure of said hydrous oxide.

10. Method as defined in claim 9 in which said organic compound is free of any aromatic ring and any aliphatic side chain intermediate the ends of the molecule.

11. Method which comprises forming a coherent, flexible self-supporting solid body consisting essentially of a crystalline inorganic hydrous oxide having a lattice structure and containing structural water and capable of swelling when brought in contact with water to form a plastic hydro-gel and exhibiting base exchange properties, rendering said solid body insoluble in water by the action of a cation capable of base exchange with the hydrous oxide and rendering said solid body more flexible by the action of an organic compound capable of entering the lattice structure of said hydrous oxide.

12. As a new product, a water insoluble flexible structure the continuous phase of which consists of a naturally crystalline inorganic hydrous oxide containing structural water and capable of swelling when brought in contact with water to form a plastic hydro-gel and exhibiting base exchange properties, said structure having incorporated therein a cation capable of base exchange with the hydrous oxide.

13. A coherent, self-supporting, flexible and water insoluble solid body of a crystalline inorganic hydrous oxide containing structural water and capable of swelling when brought in contact with water to form a plastic hydro-gel and exhibiting base exchange properties, said solid body having incorporated therein a cation capable of base exchange with hydrous oxide and, in the air dried condition, being incapable of absorbing water and reverting to a hydro-gel.

14. A coherent, self-supporting, flexible solid body, the continuous phase of which consists of a crystalline inorganic hydrous oxide containing structural water and capable of swelling when brought in contact with water to form a plastic hydro-gel and exhibiting base exchange properties and possessing at least one hexagonal type of silicon-oxygen sheet, said solid body containing base exchange cations having an ionic radius of at least 1.28 Å.

15. A coherent, self-supporting, flexible solid body as defined in claim 14 in which the base exchange cations are less hydrated than the cation of the hydrous oxide.

16. A coherent, self-supporting, flexible solid body as defined in claim 14 in which the cations are those of a water soluble amine.

17. A coherent, self-supporting, flexible solid body, the continuous phase of which consists of a crystalline inorganic hydrous oxide containing structural water and capable of swelling when brought in contact with water to form a plastic hydro-gel and exhibiting base exchange properties and possessing at least one hexagonal type of silicon-oxygen sheet, said solid body being insoluble in water and flexible due to the presence within the crystalline structure thereof, of base exchange cations having an ionic radius greater than 1.28 Å. and an organic compound.

18. A coherent, self-supporting, flexible solid body, the continuous phase of which consists of orientated unit parcels of a crystalline inorganic hydrous oxide containing structural water and capable of swelling when brought in contact with water to form a plastic hydro-gel and exhibiting base exchange properties and possessing at least one hexagonal type of silicon-oxygen sheet, said unit parcels being held together by cations having an ionic diameter at least as large as the free space between opposing oxygen atoms on the surface of the hexagonal silicon-oxygen sheets of the unit parcels, said solid body containing also a lubricating organic compound.

19. A new product as defined in claim 12 in which the solid body is a film.

20. A solid body as defined in claim 13 in the form of a film.

21. A solid body as defined in claim 14 in the form of a film.

22. A solid body as defined in claim 17 in the form of a film.

23. A solid body as defined in claim 18 in the form of a film.

ERNST A. HAUSER.